Sept. 3, 1929.            J. T. NORMAN              1,727,215
                    DRIVE UNIT FOR COAL SEPARATORS
                        Filed March 21, 1927
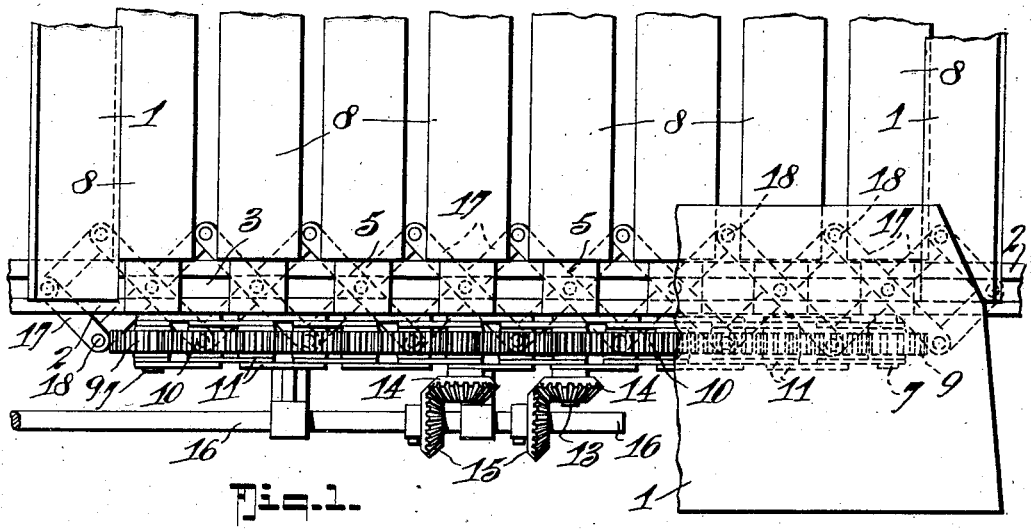
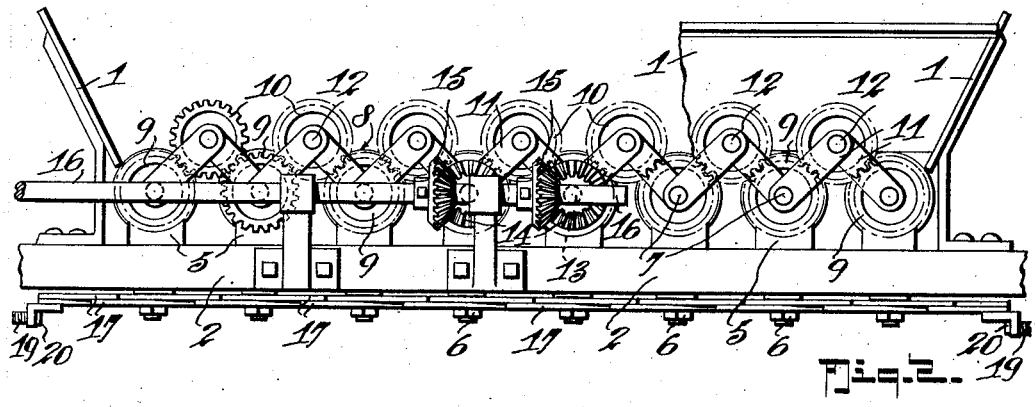
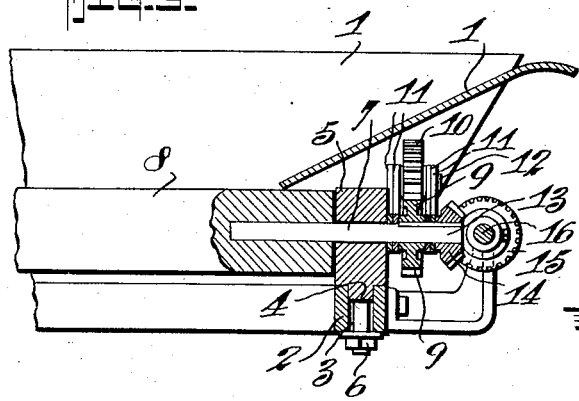
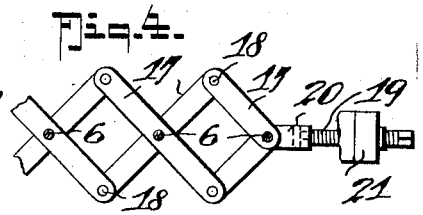
INVENTOR
Joseph T. Norman
BY
Albert E. Dudrich
ATTORNEY Patented Sept. 3, 1929.

1,727,215

UNITED STATES PATENT OFFICE.

JOSEPH T. NORMAN, OF FREDERICK, MARYLAND.

DRIVE UNIT FOR COAL SEPARATORS.

Application filed March 21, 1927. Serial No. 177,108.

The invention primarily has for its object to provide new and improved drive mechanism for coal and slate separators of the type wherein are provided parallelly positioned rollers, adjustably spaced and rotatable in a common direction to provide for and facilitate the separation of slate from coal, which said mechanism comprises drive and idler gears so connected as to remain in mesh regardless of the adjustment of spaced relation of the rollers, and means to quickly and conveniently effect the desired adjustment of said rollers and meshing gears.

In its more detailed nature the invention resides in the provision in separators of the type stated. of a driver gear fixed upon each roller shaft end, an idler gear adapted to mesh with each adjacent pair of driver gears, links connecting the axes of the gears to permanently hold the idlers in mesh with the drivers gears regardless of their adjusted spaced relation, means to impart rotation to one or more of the roller shaft ends, and other means to effect adjustment of the spaced rollers all at one and the same time and in like degree.

With the above and other objects in view that will hereinafter appear, the invention still further resides in the novel details of construction, combination and arrangement of parts, all of which will be first fully described, then be particularly pointed out in the appended claims, reference being had to the accompanying drawing, in which:—

Figure 1 is a somewhat diagrammatic plan view illustrating one end of a set of separator rollers with the invention applied thereon.

Figure 2 is a face view illustrating the drive connections.

Figure 3 is an edge view of the parts shown in Figure 1.

Figure 4 is a diagrammatic plan view of one end of the lazy tong equipment and illustrates the manner of adjusting the roller bearings.

Figure 5 is an edge view of the parts shown in Figure 4.

In the drawing in which like numerals of reference indicate like parts in all of the figures, 1 represents the side wings or hopper forming plates which are supported by suitable framing 2 including a rear transverse bearing bar cross slotted as at 3 to receive the depending webs 4 of the roller trunnion bearings 5. The bearings 5 are thus laterally adjustably mounted on the cross bar 2, the cross webs 4 serving to prevent angular displacement, and may be secured to any desired adjusted position, for adjusting the spaced parallel relation of the rollers by the threaded stem and nut connections 6. The roller trunnions which have bearing in the members 5 are indicated at 7 and the spaced separator rollers at 8.

The above described parts are well known in coal and slate separators and per se form no part of my present invention, which has for its purpose to provide a new and improved means for applying rotation to the rollers and for simultaneously adjusting the spacing of the rollers in the manner soon to be described.

In carrying out the principles of my invention each of the roller trunnions 7, at the driving end of the separator, is extended beyond the bearing and has secured thereon a driver gear 9. Intermediately of each pair of gears 9 I provide an idler gear 10 which is adapted to mesh with the said adjacent pair of gears and impart the rotation of one thereof to the other.

It is my purpose to so mount the idler gears that they will always be held in mesh with the respective driver gears regardless of their parallel space adjustment. To accomplish this I provide a plurality of links 11 pivoted at one end to the extended trunnions on which the driver gears 9 are mounted and at their other ends to the stub shafts 12 forming the axes of the idler gears 10.

The links thus form a sort of zigzag arrangement as indicated in Figure 2 of the drawing and because of the fact that the driver and idler gears 9 and 10 are positioned in mesh the latter with and between an adjacent pair of the former, and links 11 are pivoted to the axes of the driver and idler gears alternately and successively, as the spaced relation of the rollers 8 is changed, by adjustment of the bearings 5, the axes of the idler gears will be caused to move with the axes of the driver gears so that the cooperative meshing relation of the said gears will be restrained under any and all adjustments.

The links 11 may be provided at one side only of the gears or at both sides thereof as is found more practical.

For imparting rotation to the driver gears the two most centrally positioned trunnions 7 are preferably additionally extended as at 13 and equipped with bevel gears 14, each of which is adapted to mesh with a bevel gear 15 longitudinally adjustably mounted on the power shaft 16. Thus when rotation is imparted to the power shaft 16 in any suitable manner, as by a belt and pulley connection for example, the rotation of the power shaft will be imparted, through the bevel gears 15 and 14 to the innermost driver gears 9 and therefrom to the remaining idler and driver gears successively.

The means for adjusting the spacing of the separator rollers, simultaneously and in like degree, will now be described.

In carrying out this feature of the invention I provide lazy tong or connected link devices 17 loosely pivoted as at 18 and having their crossed portions apertured to receive the threaded securing stems. An adjusting screw 19 is swivelly connected to the link ends at their mounting on the end stem 6 at each side of the separator as at 20 and passes through a threaded bearing member 21 carried by the framing.

When it is desired to adjust the spaced relation of the rollers, the securing nuts on the stems 6 are loosened and the screws 19 rotated to cause the lazy tong links to be extended or contracted as the case may be to force the rollers farther apart or to draw them more closely together. When the desired spacing is attained the nuts are again tightened and the adjustment secured against displacement.

The mechanism described provides an efficient means for effecting uniform adjustment of all of the roller spacings simultaneously and without the necessity of painstaking adjustment and measurement of the individual roller bearing in the accomplishment of the desired result.

If desired the power may be applied directly to any one of the driver gears, but I prefer to apply the power in the manner just above described as the parts are thereby subjected to less strain than otherwise would be occasioned and a strain which is evenly and equally distributed.

From the foregoing description, taken in connection with the accompanying drawings, it is thought that the novel details of construction, the manner of operation and the advantages of my invention will be readily apparent to those skilled in the art to which it relates.

What I claim is:

1. In means to drive and adjust the relatively spaced relation of a plurality of rotatable shafts, a cross bar to support the shafts at one end, bearings for the shaft ends and mounted slidably on said cross bar, lazy tongs connected to the bearings, and means to actuate the lazy tongs to adjust the positions of all of the bearings simultaneously.

2. In means to drive and adjust the relatively spaced relation of a plurality of rotatable shafts, a slotted cross bar to support the shafts at one end, bearings for the shaft ends and having stems projecting through and slidable in the cross bar slot, lazy tongs having their crossed portions connected to the stems, bearing members carried by the cross bar and having threaded bearing bores therein, adjustment screws operable in the threaded bearing bores and connected to the lazy tong ends whereby when said screws are rotated the lazy tongs will be extended or contracted to vary the spaced relation of the shafts uniformly, said stems being threaded, and clamp nuts on said threaded stem ends whereby adjustments of the shafts may be secured against inadvertent displacement by securing the adjusted positions of their bearings.

3. Means to drive and adjust the relatively spaced relation of a plurality of rotatable shafts, a slotted cross bar to support the shafts at one end, bearings for the shaft ends and having stems projecting through and slidable in the cross bar slot, lazy tongs having their crossed portions connected to the stems, bearing members carried by the cross bar and having threaded bearing bores therein, adjustment screws operable in the threaded bearing bores and connected to the lazy tong ends whereby when said screws are rotated the lazy tongs will be extended or contracted to vary the spaced relation of the shafts uniformly, said stems being threaded, and clamp nuts on said threaded stem ends whereby adjustments of the shafts may be secured against inadvertent displacement by securing the adjusted positions of their bearings, a driver gear on each shaft, an idler gear between and meshing with each adjacent pair of driver gears, links connecting the idler and driver gears in mesh regardless of adjustment, and means to impart rotation to at least one of the gears.

4. Means to drive and adjust the relatively spaced relation of a plurality of rotatable shafts, a slotted cross bar to support the shafts at one end, bearings for the shaft ends and having stems projecting through and slidable in the cross bar slot, lazy tongs having their crossed portions connected to the stems, bearing members carried by the cross bar and having threaded bearing bores therein, adjustment screws operable in the threaded bearing bores and connected to the lazy tong ends whereby when said screws are rotated the lazy tongs will be extended or contracted to vary the spaced relation of the shafts uniformly, said stems being threaded, and clamp nuts on said threaded stem ends whereby adjustments of the shafts may be secured against inadvertent displacement by securing the adjusted positions of their bearings, a driver gear on each shaft, an idler gear between and meshing with each adjacent pair of driver gears, a stub shaft for loosely mounting each idler gear, links pivoted to the stub shaft of each idler gear and to the shafts of the driver gears with which said idler gear meshes to always hold that idler in mesh with said driver gears regardless of their spaced relation, and means to impart rotation to at least one of the gears.

5. Means to drive and adjust the relatively spaced relation of a plurality of rotatable shafts, a cross bar to support the shafts at one end, bearings for the shaft ends and mounted slidably on said cross bar, lazy tongs connected to the bearings, a driver gear on each shaft, an idler gear between and meshing with each adjacent pair of driver gears, links connecting the idler gear with each pair of driver gears regardless of adjustment, means to impart driving rotation to at least one of the gears thereby to turn all of said gears and means to actuate the lazy tongs to adjust the positions of all of the bearings simultaneously.

JOSEPH T. NORMAN.